United States Patent [19]

Funahashi et al.

[11] Patent Number: 5,785,267
[45] Date of Patent: Jul. 28, 1998

[54] FILM CARTRIDGE LIGHT BLOCKING DOOR OPENING/CLOSING MECHANISM

[75] Inventors: Akira Funahashi, Sakai; Junichi Tanii, Izumi, both of Japan

[73] Assignee: Minolta Co., Ltd., Osaka, Japan

[21] Appl. No.: 775,627

[22] Filed: Jan. 2, 1997

[30] Foreign Application Priority Data

Jan. 12, 1996 [JP] Japan .................. 8-004325

[51] Int. Cl.$^6$ .................................. G03B 1/56
[52] U.S. Cl. ............... 242/332; 242/326.1; 242/338; 396/536
[58] Field of Search ................. 242/332, 338, 242/326.1; 396/513, 514, 536, 538

[56] References Cited

U.S. PATENT DOCUMENTS

| | | |
|---|---|---|
| 5,220,371 | 6/1993 | Tanii et al. |
| 5,231,438 | 7/1993 | Smart. |
| 5,477,295 | 12/1995 | Lawther et al. ............ 396/538 |
| 5,550,608 | 8/1996 | Smart et al. .............. 296/538 |
| 5,563,672 | 10/1996 | Fuss et al. ............... 396/538 |
| 5,592,253 | 1/1997 | Nishimura et al. ......... 396/513 X |
| 5,600,393 | 2/1997 | Funahashi ................ 396/538 X |
| 5,630,192 | 5/1997 | Kobayashi ............... 396/538 X |
| 5,638,152 | 6/1997 | Stephenson, III et al. .... 396/538 X |
| 5,664,248 | 9/1997 | Naka et al. .............. 396/538 X |
| 5,669,018 | 9/1997 | Kamata .................. 396/538 X |

FOREIGN PATENT DOCUMENTS

| | | |
|---|---|---|
| 1-191837 | 8/1989 | Japan. |
| 07043812A | 2/1995 | Japan. |

*Primary Examiner*—Donald P. Walsh
*Assistant Examiner*—William A. Rivera
*Attorney, Agent, or Firm*—Burns, Doane, Swecker & Mathis, LLP

[57] ABSTRACT

A simple and compact opening and closing apparatus for a film cartridge which has a cylindrical body. The apparatus includes an opening section projecting over the body. The opening section has a film opening and a film cover which opens and closes the film opening. The apparatus also includes a chamber which holds the cartridge and has a loading opening for loading the cartridge into the chamber. A cartridge cover opens and closes the loading opening, and there is provided a lock for the film cover. A driver couples the cartridge cover, and a connector connects the lock with the driver so that the film cover is opened when the cartridge cover is closed. The connector is arranged in a concave area which is formed by the surface of the cylindrical body of the cartridge and the opening section projecting over the body.

14 Claims, 3 Drawing Sheets

FILM CARTRIDGE LIGHT BLOCKING DOOR OPENING/CLOSING MECHANISM

BACKGROUND OF THE INVENTION

1. Field of the Invention

The present invention pertains to a film cartridge light blocking door opening/closing mechanism, and more particularly to a opening/closing mechanism for a light blocking door located at the inlet/outlet opening of a film cartridge that houses a wound long strip of film, said film being able to be fed out or wound back into the cartridge using the inlet/outlet opening.

2. Related Art of the Invention

In conventionally proposed light blocking door opening/closing mechanisms, a film feeding/rewinding motor is used as the drive source, or, as shown in FIG. 3, drive member 1, which opens and closes the door, is linked with locking member 3 or 4 of cartridge bay cover 2 via links 5a and 5b. In FIG. 3, 6 is a film cartridge, 7 is a battery, and 8 is a condenser.

SUMMARY OF THE INVENTION

However, where a film feeding/rewinding motor is employed to open and close the light blocking door, the construction becomes complex and the burden on the motor becomes large. Where links 5a and 5b are used as shown in FIG. 3, because links 5a and 5b must make a wide detour around the sides of the camera body, the connecting links become large in size and their transmission efficiency is reduced, which in turn increases the amount of force required to operate locks 3 and 4, and increases the size and the cost of the camera as well.

Therefore, the object of the present invention is to provide an opening/closing mechanism having a simple construction that can open and close a film cartridge light blocking door with high transmission efficiency.

The present invention will be explained in further detail with reference to these drawings and a preferred embodiment.

DESCRIPTION OF EMBODIMENTS

In order to attain the object described above, the light blocking door opening/closing mechanism of a preferred embodiment of the present invention comprises a cover that opens and closes over a film cartridge bay that houses a film cartridge, a locking means that locks and unlocks said cartridge bay cover, a coupling member that is located at the other end of said cartridge bay from said cartridge bay cover and that opens and closes the light blocking door of the film cartridge, and a linking means that links said locking means and said coupling member. The linking means is located in a concave area formed by the cylindrical surface of the film cartridge and the film inlet/outlet part of said cartridge. It causes the light blocking door to open when the cartridge bay cover is locked, and causes the light blocking door to close when the cartridge bay cover is unlocked.

The present invention comprises a simple construction in which the cartridge bay cover locking means is linked with the film cartridge light blocking door coupling member by a linking member located in a concave area of the film cartridge, and the lock/unlock operation of the locking member is transmitted directly to the light blocking door with high efficiency.

Preferred Embodiments of the Invention

An embodiment of the film cartridge light blocking door opening/closing mechanism pertaining to the present invention will be explained in further detail with reference to the accompanying drawings.

Figure 1:
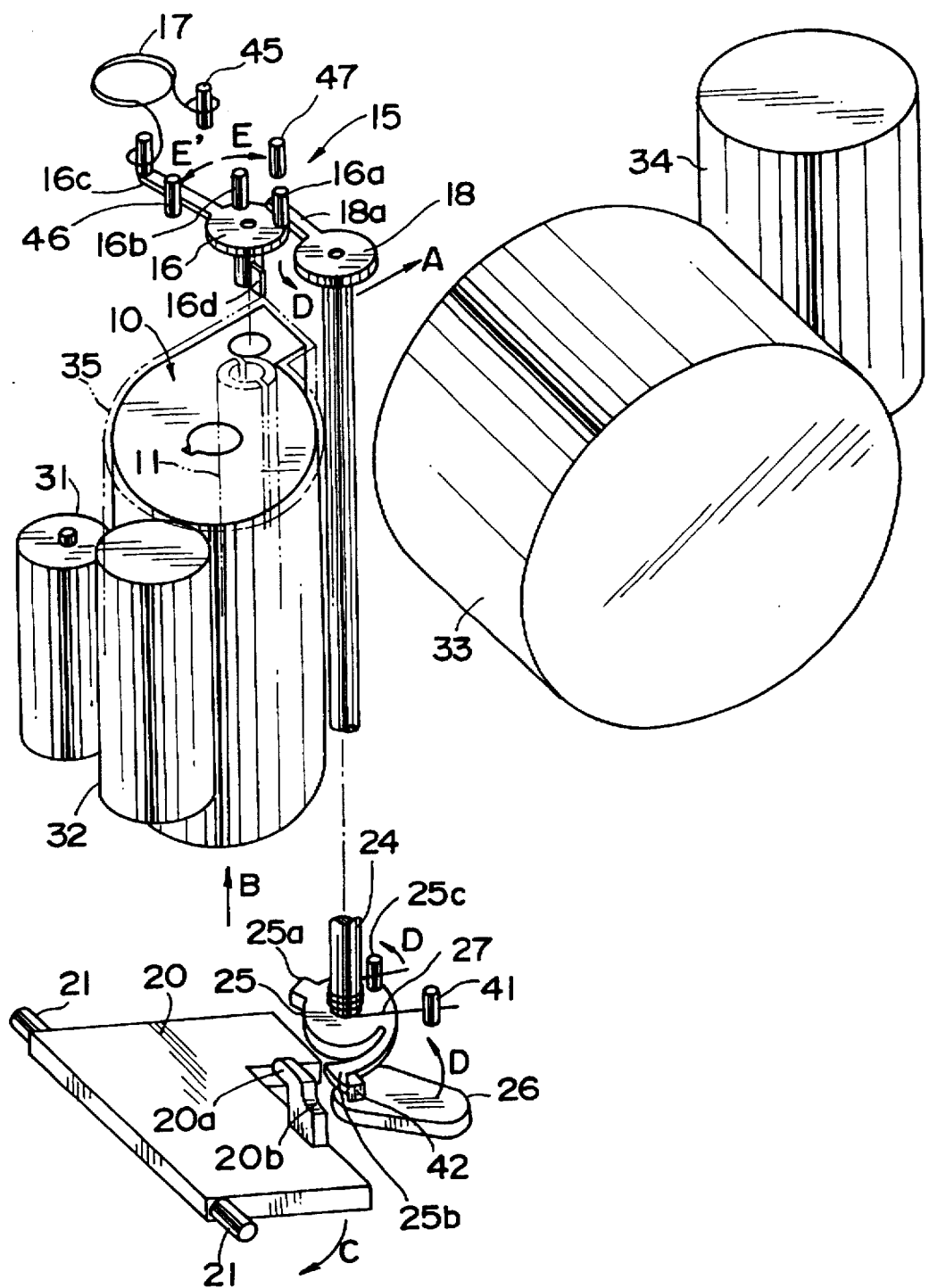
FIG. 1(A) is a perspective view showing the important parts of a camera equipped with a light blocking door opening/closing mechanism that comprises one embodiment of the present invention.
FIGS. 1(B) and 1(C) are outline drawings to clarify the operation of the cartridge bay cover of said embodiment.
Figure 1:
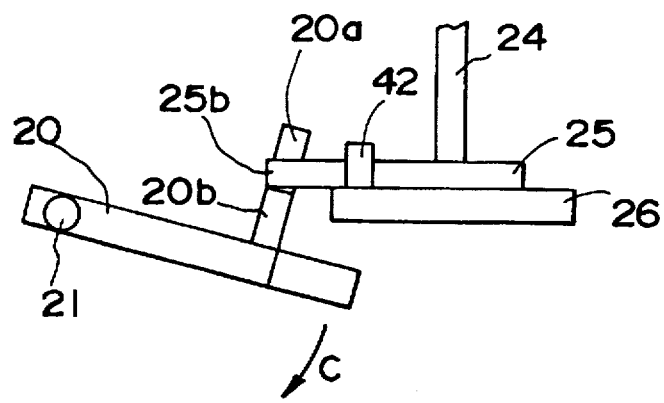
Figure 1:
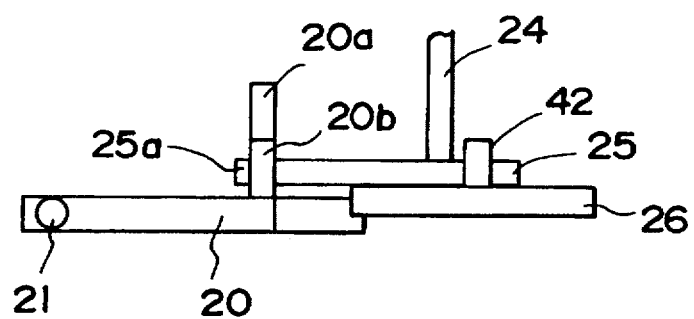
Figure 2:
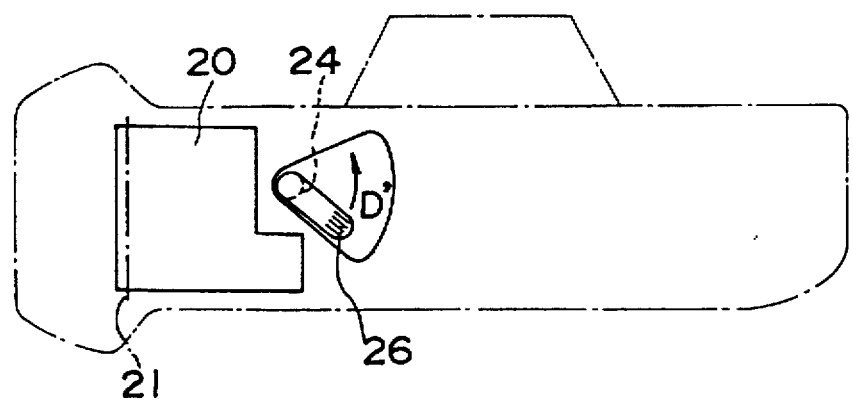
FIG. 2 is a bottom view of the camera described above.
Figure 3:
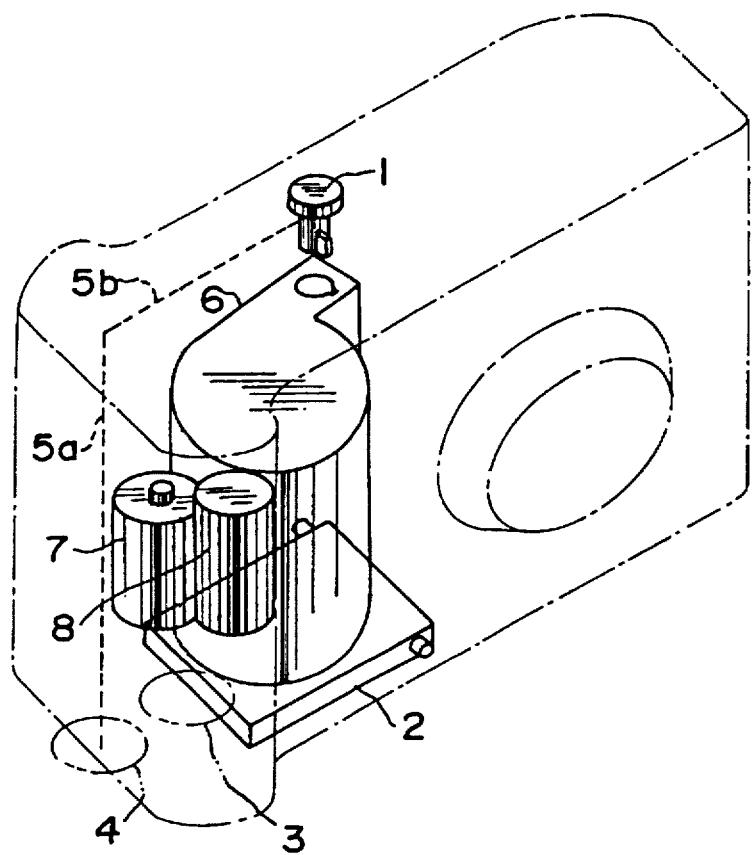
FIG. 3 is a perspective view of a camera equipped with a conventional light blocking door opening/closing mechanism.

FIG. 1(A) shows the internal construction of a camera. 10 is a film cartridge that is housed in cartridge bay 35. 31 is a battery, 32 is a condenser, 33 is a lens mount, and 34 is a spool bay. Film cartridge 10 houses a long strip of film in a wound-up state in its cylindrical housing part. Using a motor not shown in the drawing as the drive source, the film can be fed out of the inlet/outlet part, which protrudes from the cylindrical housing part, in the direction of arrow A, and the film can be also rewound in the opposite direction from that of arrow A. Film that is fed out and exposed is housed in spool bay 34. Film cartridge 10 is placed in the camera body by inserting it in the direction of arrow B into cartridge bay 35 of the camera body. Cartridge bay cover 20 is rotatably mounted to the opening of cartridge bay 35 (at the bottom of the camera body as seen in FIG. 2) using shaft 21 as a fulcrum, and cartridge bay 35 is opened up by rotating this cartridge bay cover 20 in the direction of arrow C.

Locking member 25 of cartridge bay cover 20 is fixed to the lower part of linking shaft 24 rotatably attached to the camera body, and has locking piece 25a, elastic arm 25b and protrusion 25c. Operation lever 26 is fixed to the bottom end of linking shaft 24. One end of torsion spring 27 wound around the lower part of linking shaft 24 is engaged with protrusion 41 fixed to the camera body (not shown in the drawing), and the other end is engaged with protrusion 25c of locking member 25. Therefore, locking member 25, as well as linking shaft 24, is energized by torsion spring 27 in the direction of arrow D. The tip of arm 25b of locking member 25 may engage with claw 42 fixed to the camera body.

FIG. 1(A) shows a situation in which locking member 25 has unlocked cartridge bay cover 20, where locking piece 25a is disengaged from protrusion 20a of cartridge bay cover 20. Here, the tip of arm 25b is engaged with claw 42, which maintains locking member 25 in the unlocked position. If cartridge bay cover 20 is closed, pressing member 20b formed on cartridge bay cover 20 presses against the tip of arm 25b (FIG. 1(B)). Arm 25b thereby elastically warps and disengages from claw 42, and linking shaft 24 and locking member 25 rotate in the direction of arrow D via the spring force of torsion spring 27. Locking piece 25a consequently engages with protrusion 20a, and cartridge bay cover 20 becomes locked shut (FIG. 1(C)). Unlocking is performed by rotating operation lever 26 in the opposite direction from that of arrow D, i.e., in the direction of arrow D' in FIG. 2. This disengages locking piece 25a from protrusion 20a. At the same time, the tip of arm 25b elastically warps and slides over and engages with claw 42, maintaining the unlocked state.

Light blocking door 11 is mounted to the inlet/outlet opening of film cartridge 10. This light blocking door 11 may have various configurations, including a cylindrical configuration having a slit that comprises the path for the film or a rod configuration having a light blocking blade. Coupling means 15 to open and close light blocking door 11 is located at the far end of cartridge bay 35, i.e., in the upper part of the camera body, and comprises driver 16, torsion spring 17 and linking piece 18.

Driver 16 is rotatably attached to the camera body, and includes protrusions 16a and 16b arranged in a concentric fashion, as well as lever 16c and small piece 16d that engages with one end of light blocking door 11 and transmits to said light blocking door 11 the force for its opening and closing. One end of torsion spring 17 is engaged with protrusion 45 fixed to the camera body, while the other end is engaged with the tip of lever 16c of driver 16. Stoppers 46 and 47 are fixed to the camera body and are positioned on the locus of rotation of lever 16c with a certain distance between them. Therefore, driver 16 can rotate only within the range defined by the control exerted by stoppers 46 and 47 on the movement of lever 16c. Where lever 16c is positioned in the middle of the rotatable range, torsion spring 17 is maintained in a neutral state. As explained below, when driver 16 rotates in the direction of arrow E', torsion spring 17 energizes lever 16c in the direction of arrow E' such that lever 16c is pressed against stopper 46. Light blocking door 11 then closes the inlet/outlet opening of film cartridge 10. On the other hand, when lever 16c rotates in the direction of arrow E, passing through the center area, torsion spring 17 energizes lever 16c in the direction of arrow E such that it is pressed against stopper 47. Light blocking door 11 then opens the inlet/outlet opening of film cartridge 10.

Linking piece 18 links the movement of driver 16 to locking member 25. It is fixed to the top end of linking shaft 24, while lever 18a extends to the area between protrusions 16a and 16b of driver 16. When cartridge bay cover 20 is placed in an unlocked state by locking member 25, driver 16 is in a position resulting from its being rotated in the direction of arrow E' due to the force of torsion spring 17, and light blocking door 11 is closed over the inlet/outlet opening of film cartridge 10. Thus, even if cartridge 10 is removed from cartridge bay 35, the film inside does not become exposed. Cartridge 10 is also in this state when it is inserted in the camera body. When cartridge bay cover 20 closes, and locking member 25 thereby rotates in the direction of arrow D due to the spring force of torsion spring 27, locking cartridge bay cover 20 in the closed position, linking shaft 24 and linking piece 18 rotate in the direction of arrow D and lever 18a energizes protrusion 16a in the direction of arrow E. As a result, driver 16 rotates in the direction of arrow E until lever 16c makes contact with stopper 47, whereby light blocking door 11 opens up the inlet/outlet opening of film cartridge 10. Feeding or rewinding of the film out of or into film cartridge 10 is performed with cartridge 10 in this condition. The film does not become exposed because cartridge bay cover 20 is locked shut.

On the other hand, when operation lever 26 is rotated in the direction opposite that of arrow D to unlock cartridge bay cover 20, linking shaft 24 and linking piece 18 move in the opposite direction from that described above, and lever 18a energizes protrusion 16b in the direction of arrow E'. As a result, driver 16 rotates in the direction of arrow E' until lever 16c makes contact with stopper 46, whereby light blocking door 11 closes over the inlet/outlet opening of film cartridge 10.

As explained above, in this embodiment, because light blocking door 11 of film cartridge 10 is opened only when cartridge bay cover 20 is locked, exposure of the film inside film cartridge 10 is reliably prevented. In addition, because locking member 25 of cartridge bay cover 20 is linked to coupling means 15 for light blocking door 11 via a single linking shaft 24, the movement of locking member 25 is transmitted to coupling means 15 using a simple construction and with high efficiency. In particular, because linking shaft 24 is located in a position corresponding to the concave area formed by the cylindrical surface of film cartridge 10 housed in cartridge bay 35 and the film inlet/outlet part, said position being adjacent to cartridge bay 35, the interior space of the camera body may be used efficiently.

The light blocking door opening/closing mechanism of the present invention is not limited to the above embodiment, and may have various configurations within the essential scope of the invention.

In particular, the constructions of locking member 25 of cartridge bay cover 20 and of operation lever 26, as well as of coupling means 15 of light blocking door 11, may be freely changed.

While linking shaft 24 is used as a rotational axle for locking member 25 in the above embodiment, a construction may be employed in which locking member 25 is mounted to the camera body using a separate member, and which includes a gear that rotates in response to the movement of locking member 25, as well as another gear attached to linking shaft 24 that engages with this first gear, such that the linking shaft rotates in response to the locking or unlocking of locking member 25. It is also acceptable if the movement of locking member 25 is transmitted by placing cam mechanisms at the top and bottom ends of linking shaft 24 and moving linking shaft 24 along its axis without rotating said linking shaft 24.

What is claimed is:

1. An opening and closing mechanism for a film cartridge that has a cylindrical part and a film inlet part protruding from the cylindrical part, said inlet part having an inlet opening and light blocking door that opens and closes over the inlet opening, said mechanism comprising:

a cartridge bay for holding the film cartridge and having an opening for inserting the cartridge into the cartridge bay;

a cartridge bay cover that opens and closes over the opening of the cartridge bay;

a coupling member for coupling to the light blocking door of the film cartridge;

a locking means for locking the cartridge bay cover; and a linking means for linking the coupling member and the locking means, said linking means including a linking member being located in a concave area formed by the cylindrical part of the cartridge and the inlet part protruding from the cylindrical part when the film cartridge is inserted into the cartridge bay.

2. The mechanism of claim 1 wherein the linking member comprises a single shaft, the ends of which are connected to the coupling member and the locking means, respectively.

3. The mechanism of claim 2 wherein the linking shaft is rotatable, the light blocking door is rotatable, and the open or closed state of the light blocking door is selected according to the rotational angle of the linking shaft.

4. The mechanism of claim 2 wherein the light blocking door is parallel to the single linking shaft.

5. The mechanism of claim 1 wherein the coupling member is located at the opposite end of the cartridge bay cover relative to the cartridge bay.

6. The mechanism of claim 1 wherein cartridge bay cover has a first stopper and the locking means includes a first linking piece that engages with the first stopper when the cartridge bay cover is locked.

7. The mechanism of claim 1 wherein the locking means has a second stopper and the linking means includes a second linking piece that engages with the second stopper when the cartridge bay cover is opened.

8. An opening and closing mechanism for a film cartridge that has a cylindrical part and a film inlet part protruding from the cylindrical part; said inlet part having an inlet opening and a light blocking door that opens and closes over the inlet opening; said mechanism comprising:

- a cartridge bay for holding the film cartridge and having an opening for inserting the cartridge into the cartridge bay;
- a cartridge bay cover that opens and closes over the opening of the cartridge bay;
- means for coupling to the light blocking door;
- means for locking the cartridge bay cover; and
- means for linking the coupling means with the locking means to open the light blocking door when the cartridge bay cover is locked; said linking means including a linking member being located in a concave area formed by the cylindrical part of the cartridge and the inlet part protruding from the cylindrical part when the film cartridge is inserted into the cartridge bay.

9. The mechanism of claim 8 wherein the linking member comprises a single shaft, the ends of which are connected to the coupling means and the locking means, respectively.

10. The mechanism of claim 8 wherein the coupling means is located at the opposite end of the cartridge bay cover relative to the cartridge bay.

11. The mechanism of claim 8 wherein the linking shaft is rotatable, the light blocking door is rotatable, and the open or closed state of the light blocking door is selected according to the rotational angle of the linking shaft.

12. An opening and closing mechanism for a film cartridge that has a cylindrical part and a film inlet part protruding from the cylindrical part, said inlet part having an inlet opening and light blocking door that opens and closes over the inlet opening, said mechanism comprising:

- a cartridge bay for holding the film cartridge and has an opening for inserting the cartridge into the cartridge bay;
- a coupling means for coupling the light blocking door of the film cartridge;
- a driving means for driving the coupling means; and
- a linking means for linking the coupling means and the driving means, said linking means including a linking member being located in a concave area formed by the cylindrical part of the cartridge and the inlet part protruding from the cylindrical part when the film cartridge is inserted into the cartridge bay.

13. The mechanism of claim 12 wherein the linking member comprises a single shaft, the ends of which are connected to the coupling means and the driving means, respectively.

14. The mechanism of claim 12 wherein further comprises a cartridge bay cover that opens and closes over the opening of the cartridge bay, wherein the coupling means is located at the opposite end of the cartridge bay cover relative to the cartridge bay.

* * * * *